(12) United States Patent
Pagano et al.

(10) Patent No.: US 10,918,085 B2
(45) Date of Patent: Feb. 16, 2021

(54) CANINE POWER WAKE TRAINING AID AND METHODS OF USING SAME

(71) Applicants: Francesco Pagano, Senola, GA (US); Dean C. Klipple, Clarks Summit, PA (US)

(72) Inventors: Francesco Pagano, Senola, GA (US); Dean C. Klipple, Clarks Summit, PA (US)

( * ) Notice: Subject to any disclaimer, the term of this patent is extended or adjusted under 35 U.S.C. 154(b) by 585 days.

(21) Appl. No.: 15/684,935

(22) Filed: Aug. 23, 2017

(65) Prior Publication Data
US 2018/0110204 A1 Apr. 26, 2018

Related U.S. Application Data

(60) Provisional application No. 62/496,604, filed on Oct. 24, 2016.

(51) Int. Cl.
*A01K 15/02* (2006.01)
(52) U.S. Cl.
CPC .................. *A01K 15/021* (2013.01)
(58) Field of Classification Search
CPC .... A01M 1/2072; A01M 29/12; A01M 19/00; A01M 21/00; A01M 31/008; A61L 9/032; A01K 15/021
USPC ........................................... 119/712; 43/129
See application file for complete search history.

(56) References Cited

U.S. PATENT DOCUMENTS

| | | | | |
|---|---|---|---|---|
| 4,808,347 A * | 2/1989 | Dawn | ..................... | A61L 9/122 261/30 |
| 5,305,541 A * | 4/1994 | Simpson | ............. | A01M 31/008 43/1 |
| 5,970,643 A * | 10/1999 | Gawel, Jr. | ............... | A61L 9/122 239/51.5 |
| 6,460,487 B1 * | 10/2002 | Betzen | ................. | A01M 29/06 119/712 |
| 6,484,438 B2 * | 11/2002 | Matsunaga | ......... | A01M 1/2033 43/129 |
| 8,931,327 B2 | 1/2015 | Pearce et al. | | |
| 9,352,062 B2 * | 5/2016 | Klemm | ............... | A01M 1/2055 |
| 9,352,064 B2 * | 5/2016 | Furner | .................... | A61L 9/122 |
| 9,426,977 B1 * | 8/2016 | Wynalda, Jr. | ........... | F22B 1/284 |
| 9,521,836 B2 * | 12/2016 | Willert | ................ | A01M 1/2022 |
| 9,968,701 B2 * | 5/2018 | Thompson, Jr. | ........ | A61L 9/032 |
| 9,989,552 B2 * | 6/2018 | Ferrara, Jr. | ......... | G01P 13/0093 |
| 10,028,502 B2 * | 7/2018 | Nichols | ................. | A01M 29/16 |

(Continued)

OTHER PUBLICATIONS

James C. Smith, "The Use of Canines for Explosives Detection in the Personnel Access Control Function at a Nuclear Facility", For Presentation at the New Concepts Symposium and Workshop on Detection and Identification of Explosives Oct. 30-Nov. 1, 1978.

*Primary Examiner* — Yvonne R Abbott-Lewis
(74) *Attorney, Agent, or Firm* — Zale Patent law, Inc.; James McDaniel; Lawrence P. Zale

(57) ABSTRACT

A canine power wake training aid, including: a canister having a first end and a second end; a fan operatively attached to the first end of the canister; a battery operatively attached to the canister for providing electrical power to the fan; an end cap operatively attached to the second end of the canister; and a substance such as a hazardous or illicit substance located within the canister. The system functions to concentrate the scent form the substance in a desired direction. This is used in training scent-detecting animals.

16 Claims, 5 Drawing Sheets

(56) References Cited

U.S. PATENT DOCUMENTS

| | | | |
|---|---|---|---|
| 10,278,382 B2 * | 5/2019 | Wynalda, Jr. | A01M 1/2072 |
| 2011/0027124 A1 * | 2/2011 | Albee | A61L 9/122 |
| | | | 422/5 |
| 2015/0056913 A1 * | 2/2015 | Foat | G01N 33/0057 |
| | | | 454/261 |
| 2016/0106877 A1 * | 4/2016 | Albee | A61L 9/122 |
| | | | 239/418 |
| 2016/0309701 A1 * | 10/2016 | DeHaven | A01M 31/008 |
| 2016/0339461 A1 * | 11/2016 | Kaplan | A61L 9/14 |
| 2019/0069542 A1 * | 3/2019 | Julien | A01N 35/06 |

* cited by examiner

CANINE POWER WAKE TRAINING AID AND METHODS OF USING SAME

CROSS-REFERENCE TO RELATED APPLICATIONS

This application is a continuation-in-part of U.S. Provisional Patent Application Ser. No. 62/496,604 filed Oct. 24, 2016, the disclosure of which is hereby incorporated by reference in its entirety to provide continuity of disclosure to the extent such a disclosure is not inconsistent with the disclosure herein.

STATEMENT REGARDING FEDERALLY SPONSORED RESEARCH

Not Applicable.

BACKGROUND

Field of Invention

The present invention relates to a canine training aid and methods of using the same, and more particularly a canine training aid that is used to train animals such as canines to be able to detect hazardous, illicit substances, materials or objects.

Description of Related Art

Prior to the present invention, as set forth in general terms above and more specifically below, it is known, to employ various types of animal training aids that can be used to train animals such as canines to be able to detect hazardous, illicit substances, materials or objects speculums. See, for example, U.S. Pat. No. 7,913,540 by Brasfield, U.S. Pat. No. 8,931,327 by Pearce et al., U.S. Pat. No. 8,959,982 by Pearce et al., U.S. Pat. No. 9,578,855 by Sibbald et al., U.S. Patent Application No. 2008/0127905 by Ramon et al., and U.S. Patent Application Publication 2009/0038555 by Reese. While these various animal training aids may have been generally satisfactory, there is nevertheless a need for an improved canine training aid that is used to train animals, such as canines, to be able to detect hazardous, illicit substances, materials or objects.

BRIEF SUMMARY OF THE INVENTION

A first aspect of the present invention is a canine (K9) power wake training aid, also referred to as a "Canine Power Wake Training Aid", including: a canister having a first end and a second end, a fan operatively attached to the first end of the canister, a battery operatively attached to the canister for providing electrical power to the fan; an end cap operatively attached to the second end of the canister, and a hazardous, illicit substance located within the canister.

In one embodiment of the first aspect of the present invention, the canister includes a first battery attachment operatively connected to the canister and located between the first and second ends of the canister.

In another embodiment of the first aspect of the present invention, the fan includes a multi-speed fan.

In another embodiment of the first aspect of the present invention, the fan includes a battery system power cord having a first end and a second end, wherein the first end of the battery system power cord is operatively attached to the fan and the second end of the battery system power cord is operatively connected to the battery.

In another embodiment of the first aspect of the present invention, the fan includes a power cord input located on the fan such that the power cord input is used to re-charge the battery.

In still another embodiment of the first aspect of the present invention, the battery includes a second battery attachment operatively connected to the battery such that the first battery attachment interacts with the second battery attachment in order to retain the battery on the canister.

In an even further embodiment of the first aspect of the present invention, the end cap includes a plurality of openings located on one end of the end cap, and a plurality of holes located around a periphery of the end cap.

In yet another embodiment of the first aspect of the present invention, the end cap includes an end cap retainer, wherein the end cap retainer includes a pin and a pin retainer such that the pin interacts with the plurality of holes located around the periphery of the end cap and a plurality of holes located around a periphery of the canister and the pin retainer is used to retain the pin within the plurality of holes located around the periphery of the end cap and the plurality of holes located around the periphery of the canister in order to retain the end cap on the second end of the canister.

In still another embodiment of the first aspect of the present invention, the canine power wake training aid includes a plurality of bases operatively connected to the canister for providing a sturdy base for attaching the canine power wake training aid to a surface.

In a further another embodiment of the first aspect of the present invention, the canine power wake training aid includes a hose adapter operatively connected to the end cap, and a flexible hose operatively attached to the hose adapter.

In a still further another embodiment of the first aspect of the present invention, the canine power wake training aid includes a distraction system, wherein the distraction system includes another fan, an opening located adjacent to the another fan, and another battery operatively connected to the another fan.

In a yet further another embodiment of the first aspect of the present invention, the canine power wake training aid includes a remote-control system, wherein the remote-control system includes a key fob having a plurality of buttons and a receiver operatively connected to the fan such that the key fob can operatively control the fan by interacting with the receiver operatively connected to the fan.

A second aspect of the present invention is a portable system for training a canine to detect a hazardous, illicit material using a power wake, including: canister having a first end and a second end, a fan operatively attached to the first end of the canister, a battery operatively attached to the canister for providing electrical power to the fan, an end cap operatively attached to the second end of the canister, and a hazardous, illicit substance located within the canister.

In one embodiment of the second aspect of the present invention, the canister includes a first battery attachment operatively connected to the canister and located between the first and second end of the canister.

In another embodiment of the second aspect of the present invention, the fan includes a multi-speed fan.

In another embodiment of the second aspect of the present invention, the fan includes a battery system power cord having a first end and a second end, wherein the first end of the battery system power cord is operatively attached to the fan and the second end of the battery system power cord is operatively connected to the battery.

In another embodiment of the second aspect of the present invention, the battery includes a second battery attachment operatively connected to the battery such that the first battery attachment interacts with the second battery attachment in order to retain the battery on the canister.

In still another embodiment of the second aspect of the present invention, the end cap includes a plurality of openings on one end of the end cap, and a plurality of holes located around a periphery of the end cap.

A third aspect of the present invention is a method of using a canine power wake training aid, including the steps of: providing a canister having a first end and a second end, a fan operatively attached to the first end of the canister, a battery operatively attached to the canister for providing electrical power to the fan, and an end cap, inserting a hazardous, illicit substance within the canister, attaching the end cap to the second end of the canister, determining a desired speed of the fan, activating the fan to create a source of a scent from the hazardous, illicit substance, creating a vapor wake scent cone of the scent from the hazardous, illicit substance, and allowing a canine to follow the vapor wake scent cone in a zig-zag search path to the source.

In one embodiment of the third aspect of the present invention, the step of attaching the end cap to the second end of the canister further includes the steps of: providing a plurality of holes located around a periphery of the end cap, and providing an end cap retainer, wherein the end cap retainer includes a pin and a pin retainer such that the pin interacts with the plurality of holes located around the periphery of the end cap and a plurality of holes located around a periphery of the canister such that the pin retainer is used to retain the pin within the plurality of holes located around the periphery of the end cap and the plurality of holes located around the periphery of the canister in order to retain the end cap on the second end of the canister.

The preferred Canine Power Wake Training Aid, according to various embodiments of the present invention, offers the following advantages: ease of use, lightness in weight, durability, portability, improved ability to train an animal to detect hazardous, illicit substances, materials or objects, the ability to operate the training aid remotely, the ability to provide a distraction to assist in the training of the animal, the ability to use the training aid in a variety of different training locations, the ability to provide different fan speeds, and the ability to direct the training scent to a specific output area. In fact, in many of the preferred embodiments, these advantages are optimized to an extent that is considerably higher than heretofore achieved in prior, known animal training aids.

BRIEF DESCRIPTION OF THE DRAWINGS

The above-mentioned features and steps of the invention and the manner of attaining them will become apparent, and the invention itself will be best understood by reference to the following description of the embodiments of the invention in conjunction with the accompanying drawings, wherein like characters represent like parts throughout the several views and in which:

FIG. 6 is a schematic illustration of a method of using the Canine Power Wake Training Aid, according to one embodiment of the present invention;

FIG. 7 is a schematic illustration of a method of using the Canine Power Wake Training Aid, according to a second embodiment of the present invention; and FIG. 8 is a schematic illustration of a method of using the Canine Power Wake Training Aid, according to a third embodiment of the present invention.

DETAILED DESCRIPTION OF THE PREFERRED EMBODIMENTS OF THE INVENTION

In order to fully grasp the unique aspects of the present invention, a review of the concept behind the present invention is being provided. When scent animals such as dogs are being trained to detect hazardous, illicit substances, materials or objects, typically, the trainers work in four different areas, namely, article search, vehicle search, building search and open area search. The goal of the trainers is to have the canine trained to search productive areas on its own.

Using a conventional training aid, such as a stashbox or a scent bag, will require the trainer to present productive areas to the canine in order to look for a change of behavior (COB) and a final response, such as when the canine sits (SIT). The trainer will also take into consideration the following factors; the amount of the hazardous, illicit substance, material or object; the direction and speed of the wind; the ambient temperature; the set time and the height and depth of the training aid. Clearly, taking all of these factors into consideration can be somewhat complicated and time consuming.

Figure 1:
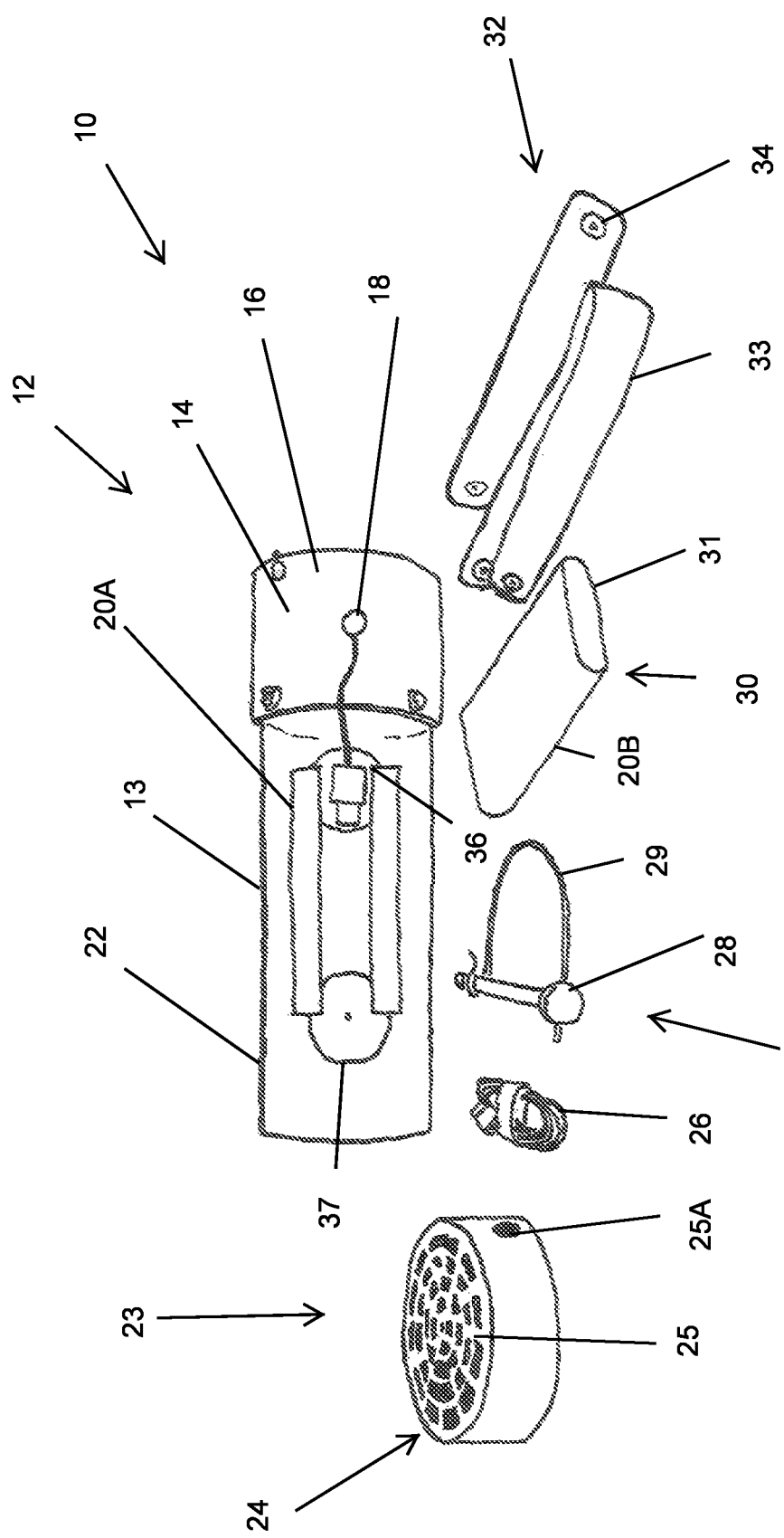
FIG. 1 is an exploded view of the Canine Power Wake Training Aid, according to one embodiment of the present invention.
Figure 2:
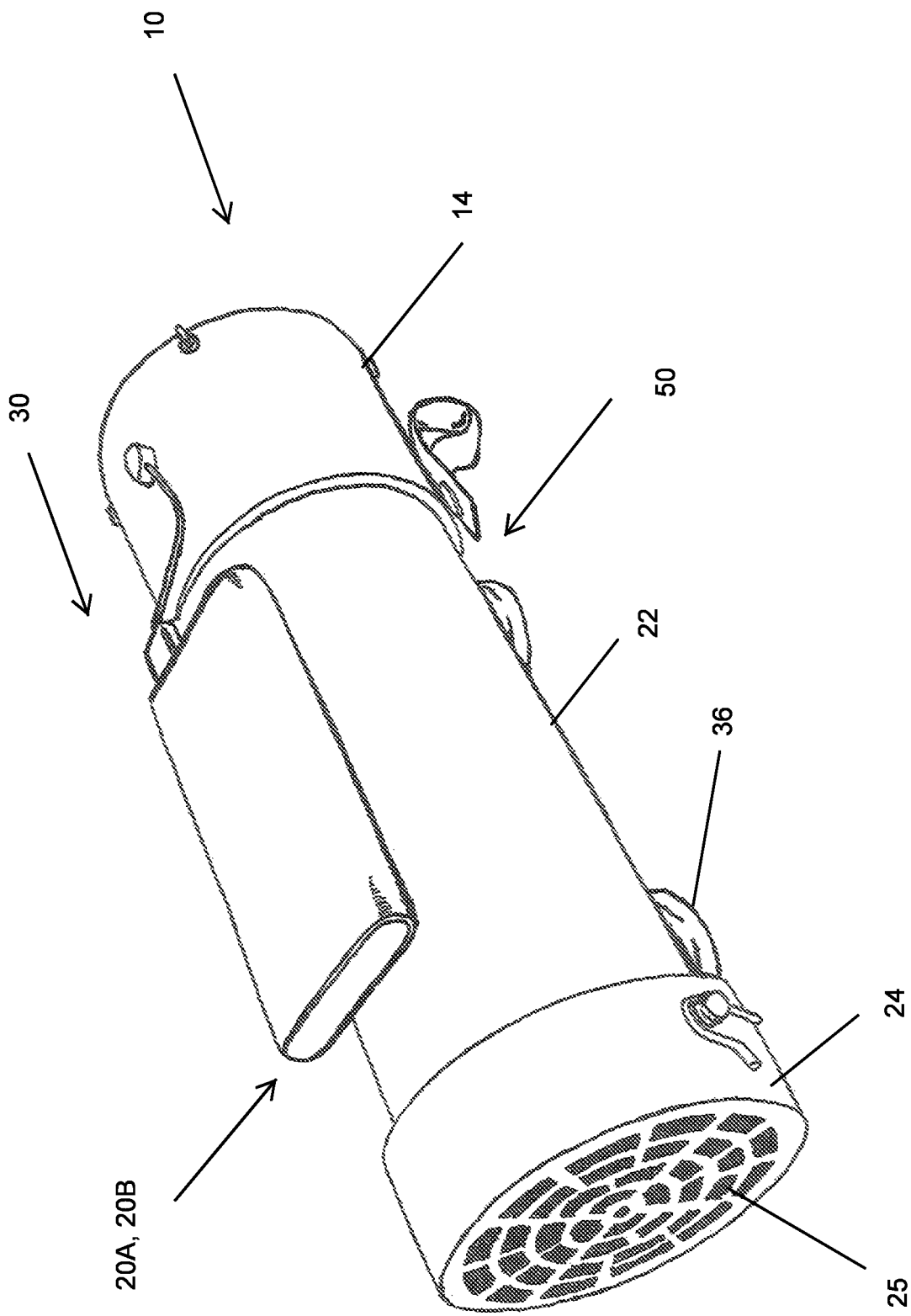
FIG. 2 is an isometric view of the Canine Power Wake Training Aid of FIG. 1.

In order to address the shortcomings of the prior, known canine training aids, reference is made now to FIGS. 1 and 2. As shown in FIGS. 1 and 2, there is illustrated a Canine Power Wake Training Aid 10, which also may be referred to simply as a "canine training aid 10". As will be explained hereinafter in greater detail, the Canine Power Wake Training Aid 10 creates a large scent cone, with a low amount of hazardous, illicit substance or material and no set time (in seconds). Also, the Canine Power Wake Training Aid 10 allows the canine to follow the scent cone to the scent source with minimal assistance from handler. Finally, the Canine Power Wake Training Aid 10 is also a great tool for inexperienced/untrained (green) dogs that are going through the scent imprinting process or working a problem for the first time in order to induce the required response (SIT, for example) and developing a change of behavior (COB).

As shown in FIGS. 1 and 2, there is illustrated Canine Power Wake Training Aid 10 that is constructed according to the present invention. Canine Power Wake Training Aid 10 includes, in part, canister system 12, end cap system 23, power cord 26, lynch pin system 27, battery system 30, carrying strap system 32 and hazardous, illicit substance, material or object 50.

With respect to canister system 12, canister system 12 includes in part, canister 13, multi-speed fan 14, battery system power cord 16, power cord input 18, battery attachments 20A and 20B, and canister bases 36. Regarding canister 13, canister 13, preferably is constructed of any suitable, lightweight, durable material that is capable of being attached to multi-speed fan 14 and end cap system 23.

Multi-speed fan 14, preferably, is any suitable fan that is capable of operating over various speeds in order to cause the scent from the hazardous, illicit substance, material or object 50 to be properly emitted from Canine Power Wake Training Aid 10.

With respect to battery system power cord 16, battery system power cord 16, preferably, is any suitable power cord that is capable of transferring electrical power from battery system 30 to multi-speed fan 14 in order to operate multi-speed fan 14.

Regarding power cord input 18, power cord input 18, preferably, is any suitable power cord input that is capable of charging battery system 30 through the use of power cord 26 and conventional battery charging technology. In this manner, the user simply attaches one end of power cord 26 into an electrical outlet or other electrical power source and plug the other end of the power cord 26 into power cord input 18 in order to charge battery system 30.

With respect to battery attachments 20A and 20B, battery attachments 20A and 20B, preferably are any suitable attachments such as Velcro® strips that are conventionally attached to one side to the canister 22 (such as battery attachments 20A) and are conventionally attached on one side of battery system 30 (such as battery attachments 20B) in order to conventionally attach battery system 30 to canister 22.

Regarding canister bases 36, canister bases 36, preferably are conventionally attached to canister 13 in order to provide a sturdy base for Canine Power Wake Training Aid 10 when Canine Power Wake Training Aid 10 is placed on a surface. A unique aspect of the present invention is that canister bases 36 can include conventional magnets 37 which allow Canine Power Wake Training Aid 10 to be attached to a metallic surface.

With respect to end cap system 23, end cap system 23, includes in part, end cap 24 and end cap vents 25. End cap 24, preferably, is constructed of any suitable, lightweight, durable material that is capable of being attached to canister 13. End cap vents 25 are conventionally formed in end cap 24 in order to allow the scent from hazardous, illicit substance, material or object 50 to be properly emitted from Canine Power Wake Training Aid 10.

Located around a periphery of end cap 24 are end cap holes 25A. As will be discussed in greater detail later, after the end user has inserted the hazardous, illicit substance, material or object 50 into canister 13, the end user places end cap system 23 over the open end of canister 13. The end user then aligns the end cap holes 25A with the holes 22 on canister 13. Next, the end user inserts the lynch pin 28 from lynch pin system 27 into the aligned end cap holes 25A and the canister holes 22. Finally, the end user attaches the conventional lynch pin lock 29 to the end of lynch pin 28 in order to secure end cap system 23 to canister system 12 so that lynch pin 28 cannot easily be removed from end cap 24.

With respect to lynch pin 28 and lynch pin lock 29, preferably, lynch pin 28 and lynch pin lock 29 are constructed of any suitable, lightweight, durable material. Furthermore, lynch pin lock 29 can be, but is not limited to, a wire that is attached at one end to one end of the lynch pin 28 and the other end of lynch pin lock 29 is wrapped around one end of lynch pin 28.

Regarding battery system 30, battery system 30 includes in part battery attachments 20B and conventionally battery 30. It is to be understood that battery 30 should be constructed so as to be able to provide enough electrical power to fan 14 in order to properly operate fan 14 over an extended period of time. As discussed above, battery attachments 20B are used in conjunction with battery attachments 20A in order to retain battery 30 on canister 13.

With respect to carrying strap system 32, carrying strap system 32, includes in part, conventional straps 33 and conventional heavy-duty snaps 34. In this manner, strap system 32 can be conventionally attached to conventional snaps located on canister system 12 in order to carry Canine Power Wake Training Aid 10. It is to be understood that while snaps 34 are illustrated, other well-known attachment devices such as clips, fasteners, clasps or the like can also be used.

Figure 3:
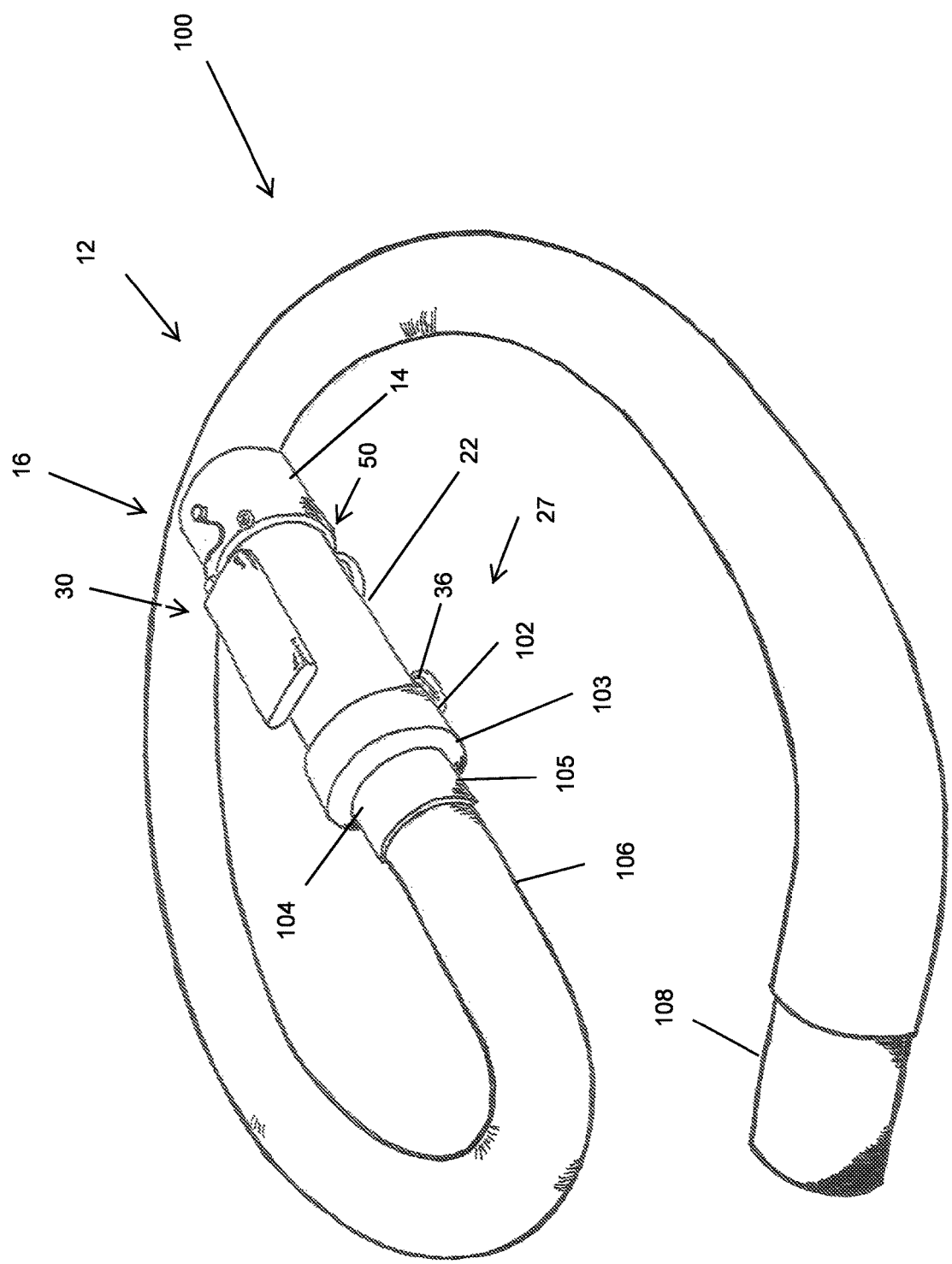
FIG. 3 is an isometric view of the Canine Power Wake Training Aid, constructed according to a second embodiment of the present invention.

With respect to FIG. 3, there is illustrated a second embodiment of the present invention. In particular, there is illustrated Canine Power Wake Training Aid 100 that is constructed according to the present invention. Canine Power Wake Training Aid 100 includes, in part, canister system 12, end cap system 102, lynch pin system 27, battery system 30, and hazardous, illicit substance, material or object 50.

It is to be understood that Canine Power Wake Training Aid 100 is constructed in substantially the same manner as Canine Power Wake Training Aid 10 except for the use of end cap system 102. Also, as will be discussed in greater detail later, Canine Power Wake Training Aid 100 can be operated in substantially the same manner as Canine Power Wake Training Aid 10.

With respect to end cap system 102, end cap system 102 includes, in part, end cap 103, end cap opening 104, hose adapter 105, flexible hose 106 and hose outlet 108. End cap 103, preferably, is constructed of any suitable, lightweight, durable material that is capable of being attached to canister system 12. End cap opening 104 is conventionally formed in end cap 103 in order to allow hose adapter 105 to be properly located within end cap opening 104. Hose 106, preferably, is any suitable flexible, durable hose that is capable of allowing the scent from hazardous, illicit substance, material or object 50 to be properly emitted from hose outlet 108.

As will be described in greater detail later, Canine Power Wake Training Aid 100 includes hose 106 to direct the output air from Canine Power Wake Training Aid 100 to a specific area within an automobile or other structure. By attaching the end cap 103 to the end of canister system 12, end user can attach a hose 106 that can then be routed to the specific output area.

Figure 4:
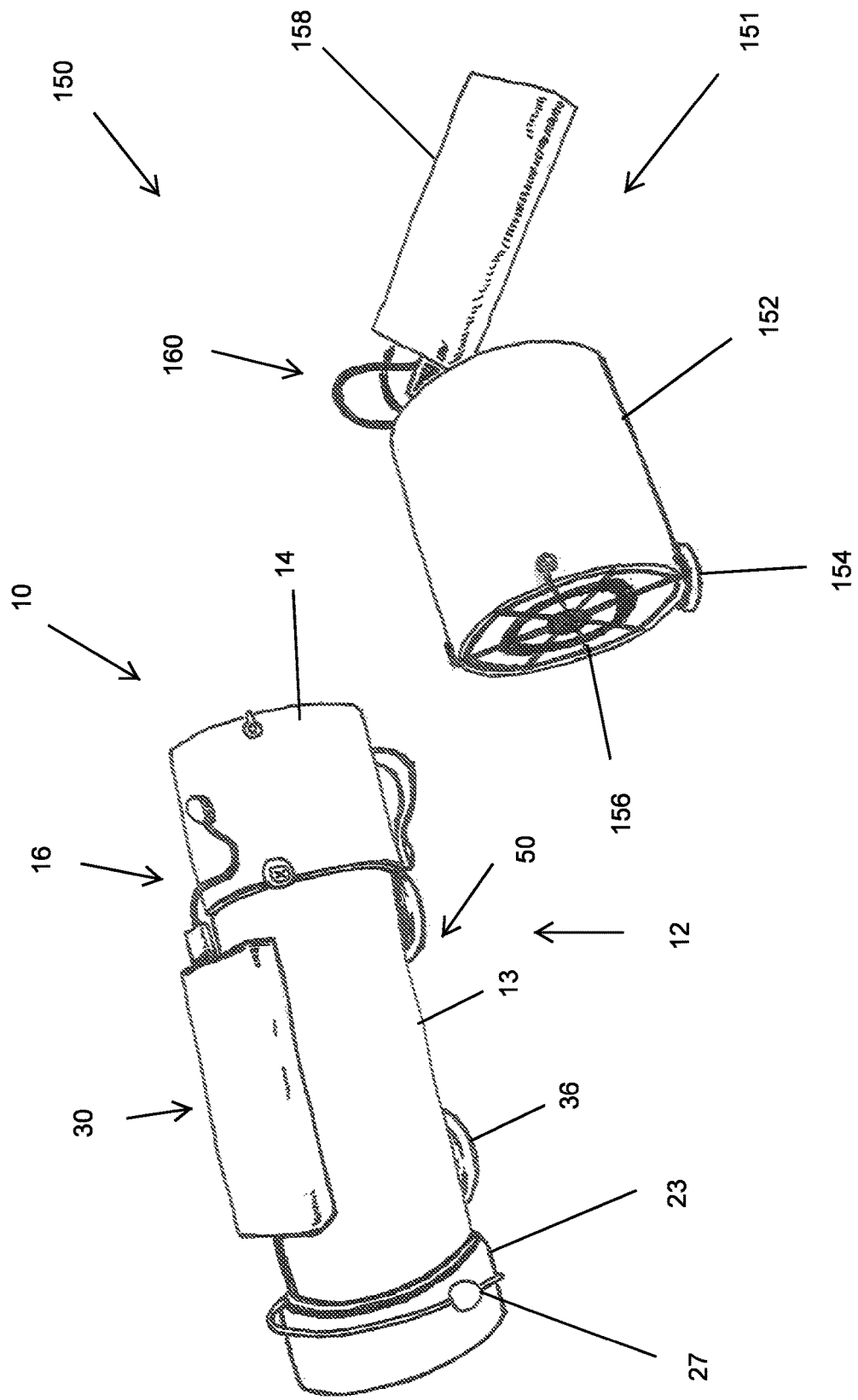
FIG. 4 is an isometric view of the Canine Power Wake Training Aid, constructed according to a third embodiment of the present invention.

With respect to FIG. 4, there is illustrated a third embodiment of the present invention. In particular, there is illustrated Canine Power Wake Training Aid 150 that is constructed according to the present invention. Canine Power Wake Training Aid 150 includes, in part, canister system 12, lynch pin system 27, battery system 30, hazardous, illicit substance, material or object 50 and distraction system 151.

It is to be understood that Canine Power Wake Training Aid 150 is constructed in substantially the same manner as Canine Power Wake Training Aid 10 except for the use of distraction system 151. Also, as will be discussed in greater detail later, Canine Power Wake Training Aid 150 can be operated in substantially the same manner as Canine Power Wake Training Aid 10.

With respect to distraction system 151, distraction system 151 includes, in part, multi speed fan 152, canister base 154, opening 156, battery 158 and battery system power cord 160. Multi speed fan 152, preferably, is constructed in substantially the same manner as multi speed fan 14 (FIGS. 1 and 2). Canister base 154, preferably, is constructed in substantially the same manner as canister bases 36. Battery 158, preferably, is constructed in substantially the same manner as battery 31. Finally, battery system power cord 160, preferably, is constructed in substantially the same manner as battery system power cord 16.

Another unique aspect of the present invention is that Canine Power Wake Training Aid 170 utilizes distraction system 151 to ensure that the canine being trained is not "keying" in on the fan sound generated by canister system 12 (FIGS. 1 and 2). By placing the distraction device 151 away from the canister system 12 in random areas during training, the canine should then be trained to ignore the fan sound from canister system 12 and focus on the training goal.

Figure 5:
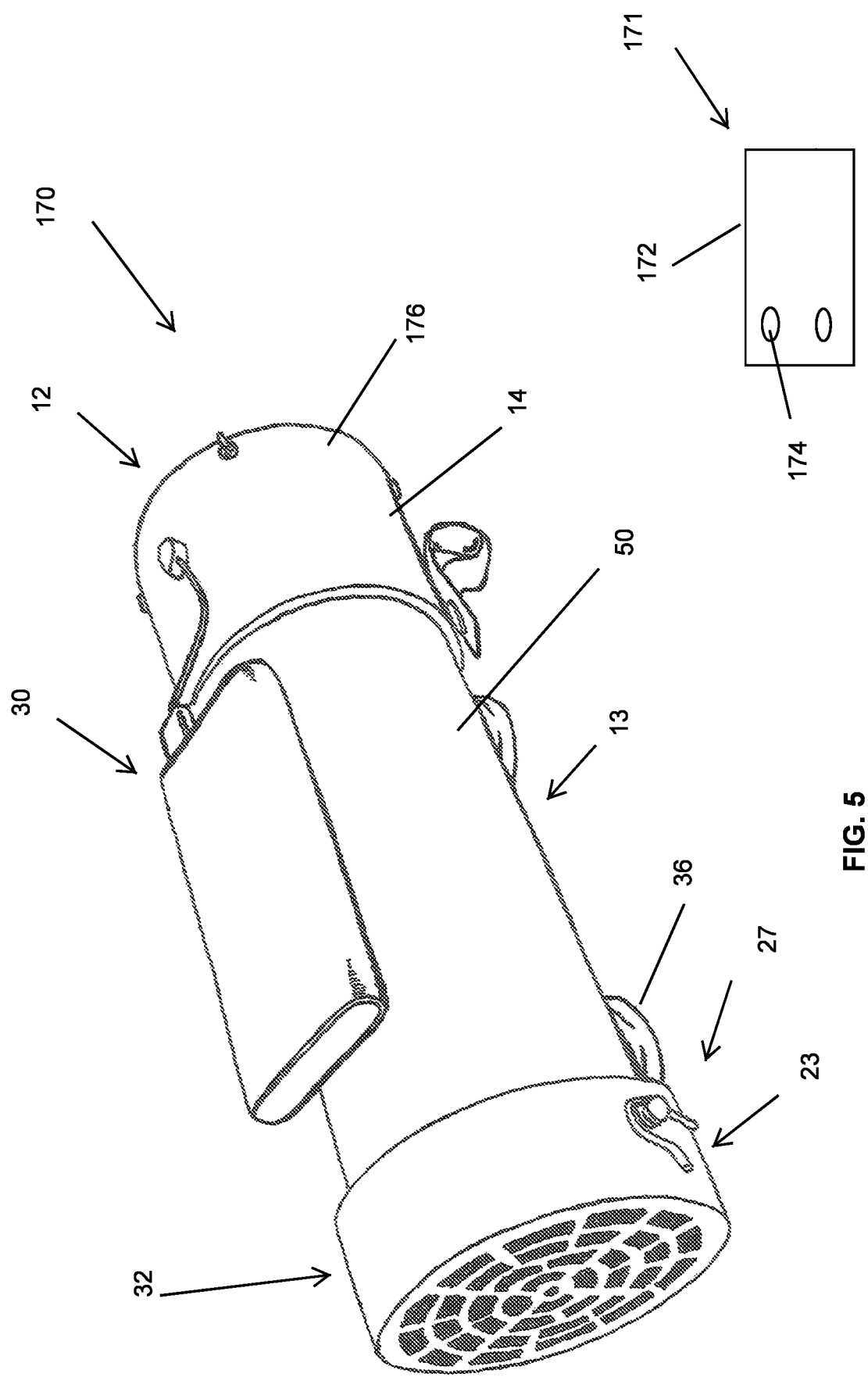
FIG. 5 is an isometric view of the Canine Power Wake Training Aid, constructed according to a fourth embodiment of the present invention.

With respect to FIG. 5, there is illustrated a fourth embodiment of the present invention. In particular, there is illustrated Canine Power Wake Training Aid 170 that is constructed according to the present invention. Canine Power Wake Training Aid 170 includes, in part, canister system 12, lynch pin system 27, battery system 30, end cap system 23, hazardous, illicit substance, material or object 50 and remote-control system 171.

It is to be understood that Canine Power Wake Training Aid 170 is constructed in substantially the same manner as Canine Power Wake Training Aid 10 except for the use of remote-control system 171. Also, as will be discussed in greater detail later, Canine Power Wake Training Aid 170 can be operated in substantially the same manner as Canine Power Wake Training Aid 10.

With respect to remote-control system 171, remote-control system 171 includes, in part, conventional key fob 172 having a plurality of buttons 174 and a conventional receiver 176 operatively connected to fan 14. Key fob 172, preferably, is any suitable remote-control device that is capable of activating fan 14 of canister system 12 wirelessly through the use of buttons 174 and receiver 176. It is to be understood that receiver 176 is conventionally connected to fan 14. In this manner, a signal from key fob 172 can then conventionally activate and deactivate fan 14.

With reference now to FIGS. 1-8, the operation and use of Canine Power Wake Training Aid 10, 100, 150 or 170 will now be discussed. As shown in FIG. 6, the method 200 of using Canine Power Wake Training Aid 10 includes inserting Canine Power Wake Training Aid 10, 100, 150 or 170 into a conventional personal carrying device 202 such as a backpack. The end user initiates operation of Canine Power Wake Training Aid 10, 100, 150 or 170 in order to cause a scent from hazardous, illicit substance, material or object 50 located in Canine Power Wake Training Aid 10, 100, 150 and 170 to start emanating from personal carrying device 202. As the scent interacts with the wind blowing in the direction of Arrow (A), the scent is formed into a scent cone 206.

Another unique aspect of the present invention is that the Canine Power Wake Training Aid 10, 100, 150 and 170 creates a large scent cone 206, with a low amount of hazardous, illicit substance, material or object 50 and no set time (in seconds) and allows the canine 204 to follow the scent cone 206 in a zig-zag search path 208 to the source (personal carrying device 202) with minimal assistance from the trainer/handler.

It is to be understood that when using the Canine Power Wake Training Aids 10, 100, 150 or 170 for the first time, the end user will notice that the canine will experience some confusion when attempting to locate the source, but after several sessions using the Canine Power Wake Training Aids 10, 100, 150 or 170, the canine will follow the scent cone 206 to source 202 with no assistance from the trainer/handler.

It is to be further understood that for a first-time user, the multi speed fan 14 should be on low and allow the canine dog to work to the source 202, with some trainer/handler assistance. After several sessions, the trainer/handler can increase the fan speed and increase the distance from the source area so that the canine can work on its own to the source with no handle assistance.

It is to even further understood that by placing the Canine Power Wake Training Aid 10, 100, 150 or 170 behind a vehicle door or inside a piece of luggage, Canine Power Wake Training Aids 10, 100, 150, and or 170 will create a positive pressure thereby inducing the canine to search productive areas, such as a vehicle door and trunk seams and luggage zippers.

For open area searches and building searches, the Canine Power Wake Training Aids 10, 100, 150 or 170 can be placed in any location that would be a productive area to search. As discussed above, the first-time end user should always start the training on low speed and assist the canine to the source 202 by presenting productive areas. After multiple training sessions, the end user can then increase the fan speed and the distance from the source 202 in order to allow the canine to work the scent cone 206 with minimal assistance.

With respect to FIG. 7, another method 300 of using Canine Power Wake Training Aid 10, 100, 150 or 170 will now be described. As shown in FIG. 7, the method 300 of using Canine Power Wake Training Aid 10, 100, 150 or 170 includes inserting Canine Power Wake Training Aid 10, 100, 150 or 170 into a conventional personal carrying device 302 such as a backpack. However, in this embodiment, the personal carrying device 302 is carried among a number of pedestrians 303 to simulate pedestrian traffic.

As discussed above with respect to method 200, the end user initiates operation of Canine Power Wake Training Aid 10, 100, 150 or 170 in order to cause a scent from hazardous, illicit substance, material or object 50 located in Canine Power Wake Training Aid 10, 100, 150 or 170 to start emanating from personal carrying device 302. As the scent interacts with the wind blowing in the direction of Arrow (A), the scent is formed into a scent cone 306.

Another further aspect of the present invention is that the Canine Power Wake Training Aid 10, 100, 150 or 170 creates a large scent cone 306, with a low amount of hazardous, illicit substance, material or object 50 and no set time (in seconds) and allows the canine 304 to follow the scent cone 306 in a zig-zag search path 308 to the source (personal carrying device 302) with minimal assistance from the trainer/handler.

It is to be understood that when teaching the canine to work a moving target such as a person with a backpack 302 or a piece of luggage, this training scenario should also be treated as conducting the search in an open area. In particular, the end user should start the fan 14 at a low speed and a short distance with assistance. After several training sessions, the end user should increase the fan speed and the distance with minimal handler assistance.

With respect to FIG. 8, another method 400 of using Canine Power Wake Training Aid 10, 100, 150 or 170 will now be described. As shown in FIG. 8, the method 400 of using Canine Power Wake Training Aid 10, 100, 150 or 170 includes inserting Canine Power Wake Training Aid 10, 100, 150 or 170 into a conventional personal carrying device 402 such as a backpack and placing the personal carrying device 402 in a vehicle. However, in this embodiment, the personal carrying device 402 is placed into a parked vehicle 403 among a number of parked vehicles 403 to simulate a vehicle parking lot.

As discussed above with respect to method 200, the end user initiates operation of Canine Power Wake Training Aid 10, 100, 150 or 170 in order to cause a scent from hazardous, illicit substance, material or object 50 located in Canine Power Wake Training Aid 10, 100, 150 or 170 to start emanating from personal carrying device 402. As the scent interacts with the wind blowing in the direction of Arrow (A), the scent is formed into a scent cone 406.

Another further aspect of the present invention is that the Canine Power Wake Training Aid 10, 100, 150 or 170 creates a large scent cone 406, with a low amount of hazardous, illicit substance, material or object 50 and no set time (in seconds) and allows the canine 404 to follow the scent cone 406 in a zig-zag search path 408 to the source (personal carrying device 402) with minimal assistance from the trainer/handler.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety.

The applicant reserves the right to physically incorporate into this specification any and all materials and information from any such patents, publications, scientific articles, web sites, electronically available information, and other referenced materials or documents to the extent such incorporated materials and information are not inconsistent with the description herein.

The written description portion of this patent includes all claims. Furthermore, all claims, including all original claims as well as all claims from any and all priority documents, are hereby incorporated by reference in their entirety into the written description portion of the specification, and Applicant(s) reserve the right to physically incorporate into the written description or any other portion of the application, any and all such claims. Thus, for example, under no circumstances may the patent be interpreted as allegedly not providing a written description for a claim on the assertion that the precise wording of the claim is not set forth specifically in the written description portion of the patent.

The claims will be interpreted according to law. However, and notwithstanding the alleged or perceived ease or difficulty of interpreting any claim or portion thereof, under no circumstances may any adjustment or amendment of a claim or any portion thereof during prosecution of the application or applications leading to this patent be interpreted as having forfeited any right to any and all equivalents thereof that do not form a part of the prior art.

All of the features disclosed in this specification may be combined in any combination. Thus, unless expressly stated otherwise, each feature disclosed is only an example of a generic series of equivalent or similar features.

It is to be understood that while the invention has been described in conjunction with the detailed description thereof, the foregoing description is intended to illustrate and not limit the scope of the invention, which is defined by the scope of the appended claims. Thus, from the foregoing, it will be appreciated that, although specific embodiments of the invention have been described herein for the purpose of illustration, various modifications may be made without deviating from the spirit and scope of the invention. Other aspects, advantages, and modifications are within the scope of the following claims and the present invention is not limited except as by the appended claims.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein or in the claims.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention as defined by the appended claims.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

It is also to be understood that as used herein and in the appended claims, the singular forms "a," "an," and "the" include plural reference unless the context clearly dictates otherwise, the term "X and/or Y" means "X" or "Y" or both "X" and "Y", and the letter "s" following a noun designates both the plural and singular forms of that noun. In addition, where features or aspects of the invention are described in terms of Markush groups, it is intended and those skilled in the art will recognize, that the invention embraces and is also thereby described in terms of any individual member or subgroup of members of the Markush group.

Other embodiments are within the following claims. Therefore, the patent may not be interpreted to be limited to the specific examples or embodiments or methods specifically and/or expressly disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

Other modifications and implementations will occur to those skilled in the art without departing from the spirit and the scope of the invention as claimed. Accordingly, the description hereinabove is not intended to limit the invention, except as indicated in the appended claims.

Therefore, provided herein is a new and improved Canine Power Wake Training Aid. The preferred Canine Power Wake Training Aid, according to various embodiments of the present invention, offers the following advantages: ease of use; lightness in weight, portability, durability, improved ability to train an animal to detect hazardous, illicit substances, materials or objects, the ability to operate the training aid remotely, the ability to provide a distraction to assist in the training of the animal, the ability to use the training aid in a variety of different training locations, the ability to provide different fan speeds, and the ability to direct the training scent to a specific output area. In fact, in many of the preferred embodiments, these advantages of ease of use, lightness in weight, portability, durability, improved ability to train an animal to detect hazardous, illicit substances, materials or objects, the ability to operate the training aid remotely, the ability to provide a distraction to assist in the training of the animal, the ability to use the training aid in a variety of different training locations, the ability to provide different fan speeds, and the ability to direct the training scent to a specific output area are optimized to an extent that is considerably higher than heretofore achieved in prior, known animal training aids.

What is claimed is:

1. A canine power wake training aid, comprising: a canister having a first end and a second end; a fan operatively attached to the first end of the canister; a battery operatively attached to the canister for providing electrical power to the fan; an end cap operatively attached to the second end of the canister; a plurality of bases operatively connected to the canister for providing a sturdy base for attaching the canine power wake training aid to a surface; a hazardous, illicit substance located within the canister; and a battery system power cord having a first end and a second end, wherein the first end of the battery system power cord is operatively attached to the fan and the second end of the battery system power cord is operatively connected to the battery; and wherein the canine power wake training aid is further comprised of a hose adapter operatively connected to the end cap; and a flexible hose operatively attached to the hose adapter.

2. The canine power wake training aid, as in claim 1, wherein the canister is further comprised of:
   a first battery attachment operatively connected to the canister and located between the first and second ends of the canister.

3. The canine power wake training aid, as in claim 2, wherein the battery is further comprised of:
   a second battery attachment operatively connected to the battery such that the first battery attachment interacts with the second battery attachment in order to retain the battery on the canister.

4. The canine power wake training aid, as in claim 1, wherein the fan is further comprised of:
   a multi-speed fan.

5. The canine power wake training aid, as in claim 1, wherein the fan is further comprised of:
   a power cord input located on the fan such that the power cord input is used to re-charge the battery.

6. The canine power wake training aid, as in claim 1, wherein the end cap is further comprised of:
   a plurality of openings located on one end of the end cap; and
   a plurality of holes located around a periphery of the end cap.

7. The canine power wake training aid, as in claim 6, wherein the end cap is further comprised of:
   an end cap retainer, wherein the end cap retainer includes a pin and a pin retainer such that the pin interacts with the plurality of holes located around the periphery of the end cap and a plurality of holes located around a periphery of the canister and the pin retainer is used to retain the pin within the plurality of holes located around the periphery of the end cap and the plurality of holes located around the periphery of the canister in order to retain the end cap on the second end of the canister.

8. The canine power wake training aid, as in claim 1, wherein the canine power wake training aid is further comprised of:
   a distraction system, wherein the distraction system includes another fan, an opening located adjacent to the another fan, and another battery operatively connected to the another fan.

9. The canine power wake training aid, as in claim 1, wherein the canine power wake training aid is further comprised of:

a remote-control system, wherein the remote-control system includes a key fob having a plurality of buttons and a receiver operatively connected to the fan such that the key fob can operatively control the fan by interacting with the receiver operatively connected to the fan.

10. A portable system for training a canine to detect a hazardous, illicit material using a power wake, comprising: a canister having a first end and a second end; a fan operatively attached to the first end of the canister; a battery operatively attached to the canister for providing electrical power to the fan; an end cap operatively attached to the second end of the canister; a plurality of bases operatively connected to the canister for providing a sturdy base for attaching the canine power wake training aid to a surface; a hazardous, illicit substance located within the canister; and a battery system power cord having a first end and a second end, wherein the first end of the battery system power cord is operatively attached to the fan and the second end of the battery system power cord is operatively connected to the battery; and wherein the canine power wake training aid is further comprised of a hose adapter operatively connected to the end cap; and a flexible hose operatively attached to the hose adapter.

11. The portable system for training a canine to detect a hazardous, illicit material using a power wake, as in claim 10, wherein the canister is further comprised of:
a first battery attachment operatively connected to the canister and located between the first and second end of the canister.

12. The portable system for training a canine to detect a hazardous, illicit material using a power wake, as in claim 11, wherein the battery is further comprised of:
a second battery attachment operatively connected to the battery such that the first battery attachment interacts with the second battery attachment in order to retain the battery on the canister.

13. The portable system for training a canine to detect a hazardous, illicit material using a power wake, as in claim 10, wherein the fan is further comprised of:
a multi-speed fan.

14. The portable system for training a canine to detect a hazardous, illicit material using a power wake, as in claim 10, wherein the end cap is further comprised of:
a plurality of openings on one end of the end cap; and
a plurality of holes located around a periphery of the end cap.

15. A method of using a canine power wake training aid, comprising the steps of:
providing a canister having a first end and a second end, a fan operatively attached to the first end of the canister, a battery operatively attached to the canister for providing electrical power to the fan, and an end cap;
inserting a hazardous, illicit substance within the canister;
attaching the end cap to the second end of the canister;
determining a desired speed of the fan;
activating the fan to create a source of a scent from the hazardous, illicit substance;
creating a vapor wake scent cone of the scent from the hazardous, illicit substance; and
allowing a canine to follow the vapor wake scent cone in a zig-zag search path to the source.

16. The method of using a canine power wake training aid, as in claim 15, wherein the step of attaching the end cap to the second end of the canister is further comprised of the steps of:
providing a plurality of holes located around a periphery of the end cap; and
providing an end cap retainer, wherein the end cap retainer includes a pin and a pin retainer such that the pin interacts with the plurality of holes located around the periphery of the end cap and a plurality of holes located around a periphery of the canister such that the pin retainer is used to retain the pin within the plurality of holes located around the periphery of the end cap and the plurality of holes located around the periphery of the canister in order to retain the end cap on the second end of the canister.

* * * * *